(12) United States Patent
Srivastava et al.

(10) Patent No.: US 7,401,034 B1
(45) Date of Patent: Jul. 15, 2008

(54) METHOD AND SYSTEM FOR IMPLEMENTING ATTRIBUTE-BASED BIDDING AND BID COMPARISON IN AN ELECTRONIC EXCHANGE

(75) Inventors: Manish Srivastava, San Carlos, CA (US); Ngai-Ming Wang, Fremont, CA (US); Robert Foushee, Alpharetta, GA (US); Parisa Hudson, San Francisco, CA (US); Dave Stephens, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 611 days.

(21) Appl. No.: 10/185,167

(22) Filed: Jun. 27, 2002

(51) Int. Cl.
*G06Q 30/00* (2006.01)
(52) U.S. Cl. .......................................... 705/26; 705/37
(58) Field of Classification Search .................... 705/26
See application file for complete search history.

(56) References Cited

U.S. PATENT DOCUMENTS

2001/0056386 A1* 12/2001 O'Halloran et al. ............ 705/28
2001/0056396 A1* 12/2001 Goino .......................... 705/37

FOREIGN PATENT DOCUMENTS

WO   WO200127840 A1 *  4/2001
WO   WO200127840 A1 * 12/2001

OTHER PUBLICATIONS

Teich et al., Designing Electronic Auctions: an Internet-Based Hybrid Procedure Combining Aspects of Negotiations and Auctions, Electronic Commerce Research, Jul. 2001, Col. 1, Issue 3, pp. 301-314.*
Design of Roles and Protocols for Electronic Negotiations Michael Strobel. Electronic Commerce Research. Boston: Jul. 2001. vol. 1, Iss. 3; p. 335.*
Trading Portfolios Electronically—An Experimental Approach Sayee Srinivasan. Netnomics : Economic Research and Electron Networking. Amsterdam: Mar. 2002. vol. 4, Iss. 1; p. 39.*
Application of flexible pricing in business-to-business electronic commerce, Bichler et al, IBM Systems Journal, 2002, vol. 41, Iss. 2, p. 287, 15 pages.*
Levi, Lili, Reflections on the FCC's recent approach to structural regulation of the electronic mass media, Federal Communications Law Journal v52n3 pp. 581-617, May 2000, downloaded from Dialong Web on Mar. 3, 2008.*

* cited by examiner

*Primary Examiner*—James Zurita (57) ABSTRACT

An auction method for implementing attribute-based bidding and bid comparison in an electronic exchange. A specification defining an auction for an item is received, wherein the specification comprises a plurality of attributes of the item. An attribute defines the functionality of an aspect of the item with respect to the current auction. At least one attribute comprises a value and a score associated with the value and a portion of the plurality of attributes comprise a relative weight. The auction is then published to at least one bidder. A bid is received from a bidder, wherein the bid comprises a value associated with at least one attribute. A composite score for the bid is calculated based on the bid and the specification. A plurality of bids are then ranked based on the composite score for each bid. An evaluation score is calculated for each bid based on the bid price and composite score. A plurality of bids are then ranked based on the evaluation score for each bid.

16 Claims, 8 Drawing Sheets

200

| | | | BIDS 500 | | COMPOSITE SCORES 510 | | EVALUATION SCORES 520 |
|---|---|---|---|---|---|---|---|
| BID 1 | DELIVERY DATE: | 06/15/02 | | 50 * 0.30 = | 15 | $\frac{90}{85} = 1.05$ (RANK-1) |
| | COLOR: | GREEN | | 100 * 0.20 = | 20 | |
| | RADIUS: | 19 INCHES | | 100 * 0.50 = | 50 | |
| | | | | TOTAL | 85 (RANK-3) | |
| | PRICE PER UNIT: | $90 | | | | |
| BID 2 | DELIVERY DATE: | 05/25/02 | | 100 * 0.30 = | 30 | $\frac{110}{90} = 1.22$ (RANK-3) |
| | COLOR: | RED | | 100 * 0.20 = | 20 | |
| | RADIUS: | 21 INCHES | | 80 * 0.50 = | 40 | |
| | | | | TOTAL | 90 (RANK-1) | |
| | PRICE PER UNIT: | $110 | | | | |
| BID 3 | DELIVERY DATE: | 05/27/02 | | 100 * 0.30 = | 30 | $\frac{95}{88} = 1.08$ (RANK-2) |
| | COLOR: | BLUE | | 40 * 0.20 = | 8 | |
| | RADIUS: | 19.5 INCHES | | 100 * 0.50 = | 50 | |
| | | | | TOTAL | 88 (RANK-2) | |
| | PRICE PER UNIT: | $95 | | | | |

```
┌─────────────────────────────────────┐
│ RECEIVING A SPECIFICATION DEFINING AN│
│ AUCTION FOR AN ITEM WHEREIN THE      │
│ SPECIFICATION COMPRISES A PLURALITY  │
│ OF ATTRIBUTES OF THE ITEM            │
│ 310                                  │
└─────────────────────────────────────┘
                 │
                 ▼
┌─────────────────────────────────────┐
│ PUBLISHING THE AUCTION TO AT LEAST  │
│ ONE BIDDER                          │
│ 320                                 │
└─────────────────────────────────────┘
                 │
                 ▼
┌─────────────────────────────────────┐
│ RECEIVING A BID FROM A BIDDER WHEREIN│
│ THE BID COMPRISES A VALUE ASSOCIATED │◄──┐
│ WITH AN ATTRIBUTE                    │   │
│ 330                                  │   │
└─────────────────────────────────────┘   │
                 │                          │
                 ▼                          │
┌─────────────────────────────────────┐   │
│ CALCULATING A COMPOSITE SCORE FOR   │   │
│ THE BID BASED ON THE BID AND THE    │   │
│ SPECIFICATION                       │   │
│ 340                                 │   │
└─────────────────────────────────────┘   │
                 │                          │
                 ▼                          │
             ╱ ARE THERE ╲     YES          │
            ╱  MORE BIDS  ╲────────────────┘
            ╲  TO RECEIVE? ╱
             ╲    350     ╱
                 │ NO
                 ▼
┌─────────────────────────────────────┐
│ RANKING THE BIDS BY COMPOSITE SCORE │
│ 360                                 │
└─────────────────────────────────────┘
```

ATTRIBUTE A (DELIVERY DATE)

| | |
|---|---|
| RELATIVE WEIGHT | 0.30 |
| DELIVERY BY 06/01/02 | 100 |
| DELIVERY BETWEEN 06/02/02 AND 06/10/02 | 80 |
| DELIVERY BETWEEN 06/11/02 AND 06/15/02 | 50 |
| DELIVERY AFTER 06/15/02 | 0 |

ATTRIBUTE B (COLOR)

| | |
|---|---|
| RELATIVE WEIGHT | 0.20 |
| RED | 100 |
| GREEN | 100 |
| BLUE | 40 |
| ALL OTHER COLORS | 0 |

ATTRIBUTE C (RADIUS)

| | |
|---|---|
| RELATIVE WEIGHT | 0.50 |
| < 20 INCHES | 100 |
| 20-21.99 INCHES | 80 |
| 22-24 INCHES | 60 |
| > 24 INCHES | 0 |

FIGURE 4

BIDS
500

BID 1
- DELIVERY DATE: 06/15/02
- COLOR: GREEN
- RADIUS: 19 INCHES
- PRICE PER UNIT: $90

BID 2
- DELIVERY DATE: 05/25/02
- COLOR: RED
- RADIUS: 21 INCHES
- PRICE PER UNIT: $110

BID 3
- DELIVERY DATE: 05/27/02
- COLOR: BLUE
- RADIUS: 19.5 INCHES
- PRICE PER UNIT: $95

COMPOSITE SCORES
510

BID 1
$50 * 0.30 = 15$
$100 * 0.20 = 20$
$100 * 0.50 = 50$
TOTAL  85 (RANK-3)

BID 2
$100 * 0.30 = 30$
$100 * 0.20 = 20$
$80 * 0.50 = 40$
TOTAL  90 (RANK-1)

BID 3
$100 * 0.30 = 30$
$40 * 0.20 = 8$
$100 * 0.50 = 50$
TOTAL  88 (RANK-2)

EVALUATION SCORES
520

$\frac{90}{85} = 1.05$ (RANK-1)

$\frac{110}{90} = 1.22$ (RANK-3)

$\frac{95}{88} = 1.08$ (RANK-2)

METHOD AND SYSTEM FOR IMPLEMENTING ATTRIBUTE-BASED BIDDING AND BID COMPARISON IN AN ELECTRONIC EXCHANGE

FIELD OF INVENTION

Embodiments of the present invention pertain to the field of electronic commerce. More particularly, the present invention relates to a method and system for implementing attribute-based bidding and bid comparison in electronic commerce buying and selling operations.

BACKGROUND OF THE INVENTION

Buyers and sellers use a variety of techniques to ensure goods and services meet their mutual expectations. However, traditional procurement systems have been proven to be error prone, labor intensive, and costly operations. For example, often times, when a buyer is looking to purchase a batch of articles, a buyer might negotiate terms for the purchase prior to making the purchasing decision. The negotiation allows the buyer and seller to ensure the articles and terms (e.g., price, quantity, delivery conditions, etc.) will meet any specific requirements. Traditional buying and selling mediums, such as auctions, catalog based purchasing, and selling, and the like, do not always facilitate the most efficient matching of requirements. The recent ascendancy of electronic commerce provides a means of avoiding, or at least reducing, the problems presented by the use of traditional buying and selling mediums.

In many respects, the Internet and the World Wide Web based network technologies have largely eliminated the most labor intensive and costly portions of the buying and selling type commerce operations (e.g., the use of mass mailings, printed specifications, catalogs, updating preprinted product information, etc.). To take advantage of advances in network technology, a variety of electronic commerce facilitating schemes have been developed. One such scheme involved the use of business-to-business buying and selling exchanges implemented on the Internet. The term "electronic commerce" or "e-commerce" originally evolved from remote forms of electronic shopping to mean all aspects of business and market processes enabled by wide area communications networks, namely, the Internet and the World Wide Web based network technologies. E-commerce is a rapidly growing field, and is generally understood to mean doing business on-line or selling and buying products and services through Web (e.g., Internet based) storefronts or through other similar distributed computer networks. In general, electronic commerce is substantially similar to the more traditional catalog based commerce schemes. The business-to-business e-commerce exchanges, or simply "B2B exchanges" have evolved to focus on the specific needs and requirements of buying and selling between businesses.

As the use of B2B exchanges has proliferated, the implementation of electronic commerce auctions has become increasingly common. Auctions are different from traditional catalog based commerce schemes. Auctions generally aggregate buyers or sellers to purchase or sell items/services through the respective submission of competitive bids. Generally, the most competitive bid is designated the winner of the auction. For example, in an auction amongst multiple competing buyers, the most competitive bid is usually the bid offering the most money for the specified item or service. In an auction amongst multiple competing sellers, the most competitive bid is usually the bid offering the specified item or service for the lowest price.

Thus, buyers and sellers participating in an auction compete with one another on the basis of the terms of their bids. Auctioneers have an interest in making the bidding process as competitive as possible to effect the most efficient matching of requirements between sellers and buyers (e.g., getting the best deal). Large numbers of buyers or sellers competitively trying to outbid one another usually leads to the most favorable terms.

However, auctions are usually rigid with respect to certain terms. For example, in a procurement auction with multiple sellers, a buyer will establish certain terms such as a required delivery date, a required quantity, or other terms describing the item (e.g., color, size or condition). If a seller can meet the terms, they may bid on the item. However, if the seller cannot meet all of the required terms, they cannot bid on the item. Because auctions are rigid, it is not possible for a potential bidder to deviate from the structure of the auction, often to the detriment of the organizer of the auction as well as the bidder.

Consider the following example. In an auction amongst multiple competing suppliers (e.g., sellers), the buyer establishes a required delivery date. If a potential supplier cannot meet that delivery date, they can not enter the auction. However, it is possible that the potential seller would make the lowest bid in price, but would miss the delivery date by a short time period. Furthermore, it is possible that the buyer would want to accept the bid of the potential supplier because it is so low and because the delivery date is only missed by a few days. It is possible that it is of more value to the buyer to get the lower priced item at a later date.

Unfortunately, current auction formats do not permit deviation from the required criterion as detailed by the auction organizer. As such, current auction formats are not flexible enough to account for the true value of the item to the auction organizer, but rather only account for rigid predefined terms.

SUMMARY OF THE INVENTION

Accordingly, what is required is a solution for implementing an auction method that is less rigid than current auction methods. The required solution should allow for the organizer of the auction to define an auction by determining attributes of an item and assigning a score based on a value submitted in a bid. Additionally, the required solution should allow for the organizer of the auction to assign attributes a relative weight with respect to other attributes. Embodiments of the present invention provide a novel solution to the above requirements.

In one embodiment, the present invention is implemented as an auction method for implementing attribute-based bidding in an electronic exchange is described herein. A specification defining an auction for an item is received, wherein the specification comprises a plurality of attributes of the item. An attribute defines the functionality of an aspect of the item with respect to the current auction. At least one attribute comprises a value and a score associated with the value and a portion of the plurality of attributes comprise a relative weight. In one embodiment, one attribute is a price of the item.

The auction is then published to at least one bidder. In one embodiment, the auction is published to a bidder via a distributed computer network. A bid is received from a bidder, wherein the bid comprises a value associated with at least one attribute. A composite score for the bid is calculated based on the bid and the specification.

In one embodiment, the composite score is calculated by first determining the score for each attribute based on value as submitted in the bid. A weighted score is then calculated for each attribute by multiplying the score by the relative weight. Totaling the weighted score for each attribute of a bid determines the composite score. In one embodiment, an evaluation score is determined by dividing a price of the item as received in the bid by the composite score for the bid.

In one embodiment, a plurality of bids is ranked based on the composite score for each bid. In another embodiment, a plurality of bids is ranked based on the evaluation score for each bid.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

The present invention provides a method and system for implementing attribute-based bidding and bid comparison in an electronic exchange (e.g., an auction). Embodiments of the present invention allow for the organizer of the auction to define an auction by determining attributes of an item and assigning a score based on a value submitted in a bid. Additionally, embodiments of the present invention allow for the organizer of the auction to assign attributes a relative weight with respect to other attributes. Additionally, embodiments of the present invention provide the organizer of the auction with a true value of the bid as based on the predefined attributes.

It should be appreciated that embodiments of the present invention may implement attribute-based bidding and bid comparison for an item or service in an auction. For purposes of the present application, the term "item" is understood to refer to both items and/or services. Furthermore, embodiments of the present invention also apply to requests for information (RFIs), requests for proposals (RFPs), and requests for quotes (RFQs), as well as auctions. For purposes of the present application, the term "auction" is also understood to refer to RFIs, RFPs and RFQs (collectively RFXs).

Embodiments of the present invention may be directed towards private and public exchanges, wherein private exchanges are scenarios having one auction organizer and many bidders, and wherein public exchanges have many organizers and many bidders. For purposes of simplicity, the present application refers to private exchanges.

Notation and Nomenclature

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "publishing" or "calculating" or "determining" or "totaling" or "ranking" or the like, may refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Figure 1:
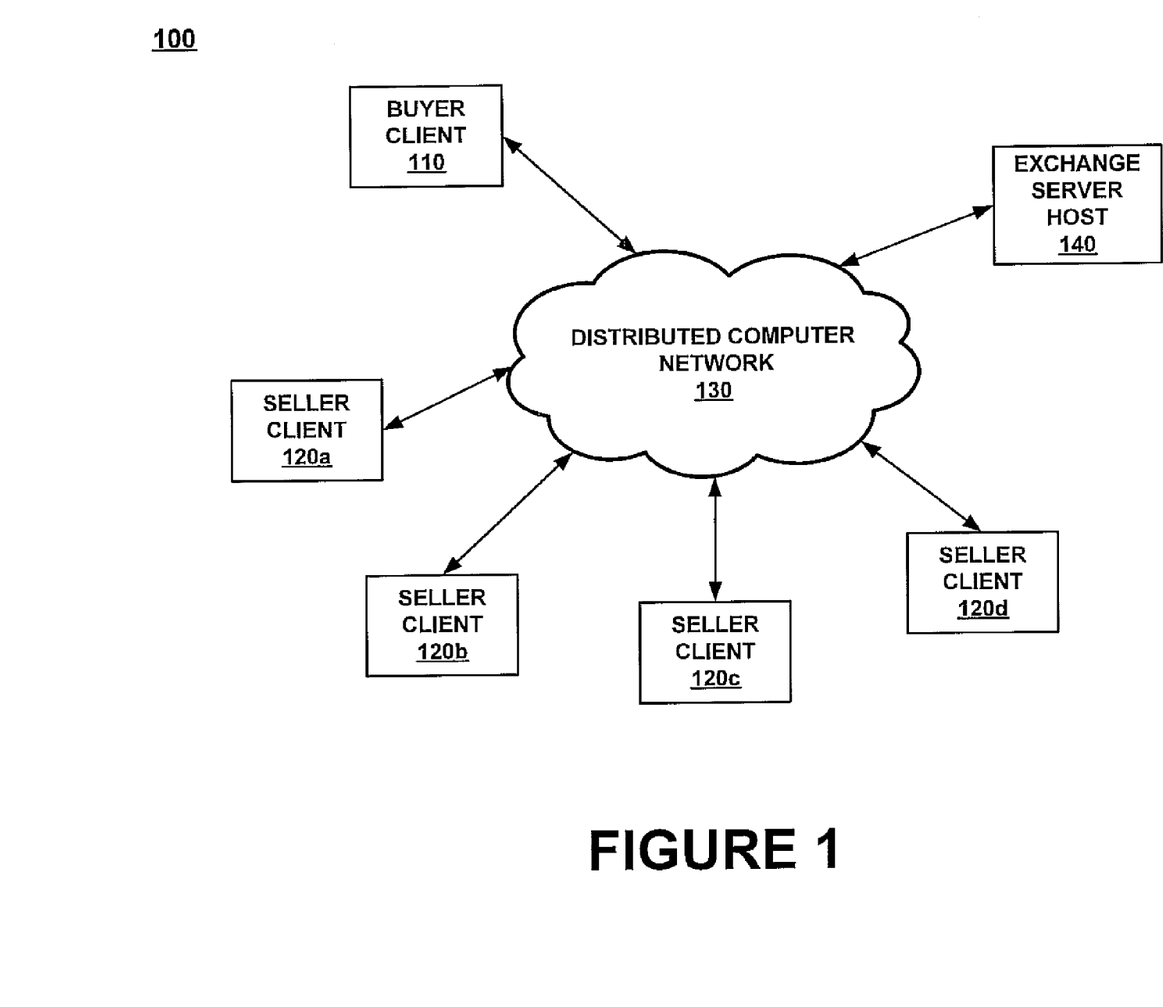
FIG. 1 illustrates a block diagram of an electronic commerce auction operation in accordance with one embodiment of the present invention.

Method and System for Implementing Attribute-Based Bidding and Bid Comparison in an Electronic Exchange Referring now to FIG. 1, a diagram of an electronic exchange auction system 100 in accordance with one embodiment of the present invention is shown. As depicted in FIG. 1, system 100 includes an exchange server host 140 communicatively coupled to a buyer client 110 and a plurality of seller clients 120a-d via a distributed computer network 130. Auction operations in accordance with system 100 are at times referred to as "reverse auctions" or "procurement auctions" where sellers submit competing bids to sell specified products and/or services to a buyer.

The exchange server host 140 functions as the central communications point for the auction operations, by conducting data collection and management of item information (e.g., items, services, or the like) and the auction specification provided by buyer clients, such as buyer client 110, and auction bid information provided by the seller clients 120a-d. In one embodiment, exchange server host 140 performs a method for implementing attribute-based bidding and bid comparison (e.g., process 300 of FIG. 3). Buyer client 110 and seller clients 120a-d communicate with exchange server host 140 via the communications protocols of distributed computer network 130, hereafter simply network 130. Exchange server host 140 conducts the auction operations on the basis of a comparison of the competing bid information from seller clients 120a-d.

A typical auction operation comprises seller clients 120a-d accessing a specification defining an auction for an item stored on exchange server host 140 by buyer client 110 and submitting competing bids to exchange server host 140 for the item. The bids are transmitted from seller clients 120a-d to exchange host server 140 via network 130. Similarly, the specification is provided to exchange server host 140 by buyer client 110 via network 130.

It should be noted that the embodiment of the present invention depicted in FIG. 1 (e.g., system 100) is implemented as a software based process cooperatively executing on the respective computer system platforms of both exchange server host 140 and seller clients 120a-d. The basic components of the computer system platforms are shown in the example computer system 800 of FIG. 8 below.

Referring still to FIG. 1, network 130 includes well know network technologies. For example, network 130 can be implemented using LAN technologies (e.g., Ethernet, Token-ring, etc.), the Internet, or other wired or wireless network technologies. The communications links between exchange server host 140, buyer client 110, seller clients 120a-d and network 130 can be implemented using, for example, a telephone circuit, communications cable, optical cable, wireless link, or the like.

Figure 2:
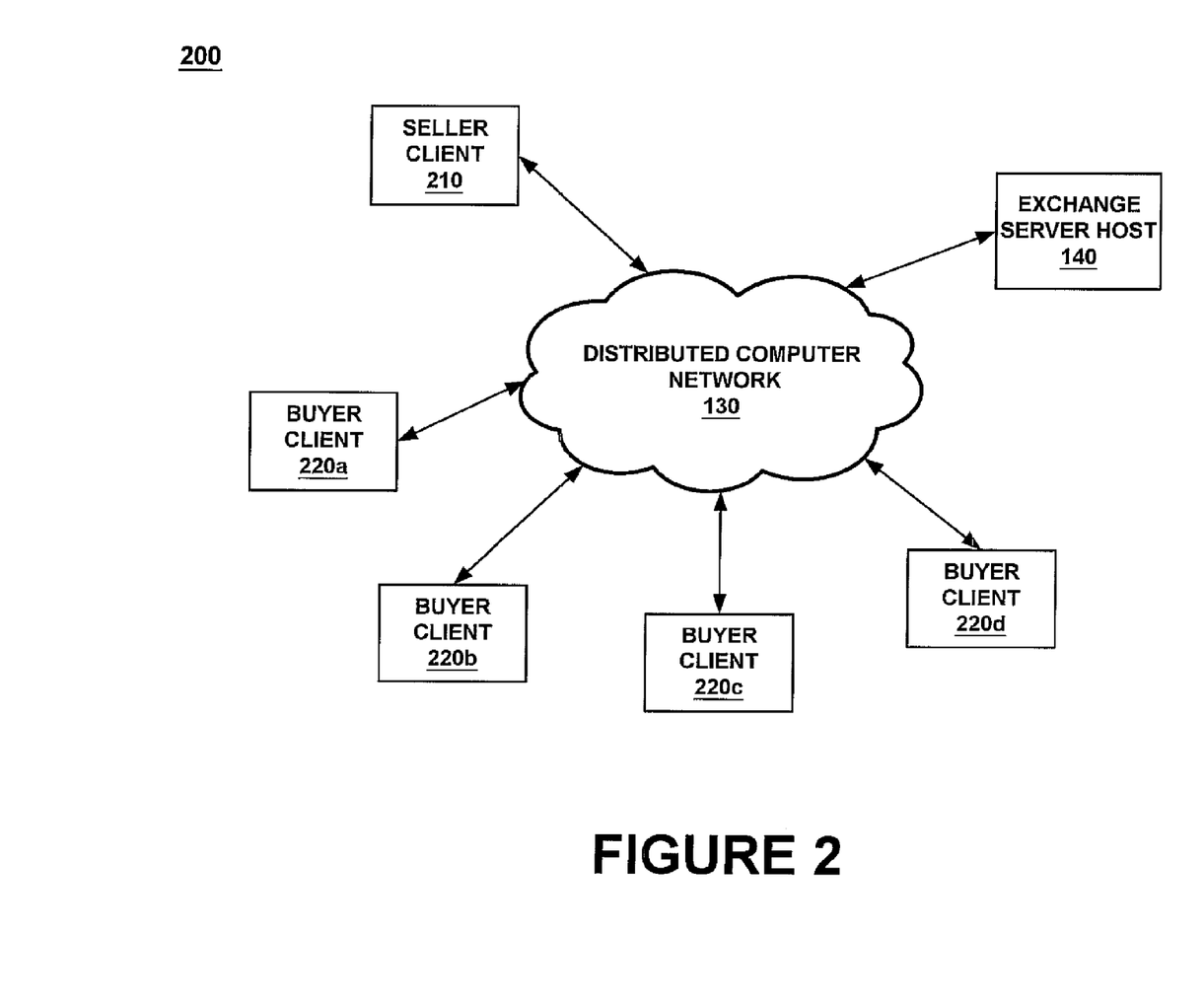
FIG. 2 illustrates a block diagram of an electronic commerce auction operation in accordance with an alternative embodiment of the present invention.

FIG. 2 shows a system 200 in accordance with an alternative embodiment of the present invention. System 200 is substantially similar to system 100 of FIG. 1, however, system 200 depicts an auction operation wherein competing buyer clients 220a-d bid to buy products or services from a seller client 210. Auction operations in accordance with system 200 are at times referred to as "standard auctions" or where buyers submit competing bids to purchase specified items and/or services from a seller.

The auction operation depicted in FIG. 2 comprises buyer clients 220a-d accessing a specification defining an auction for an item stored on exchange server host 140 by seller client 210 and submitting competing bids to exchange server host 140 in order to buy the specified product or service from seller client 210. In a manner similar to system 100 of FIG. 1, the bids are transmitted from buyer clients 220a-d to exchange host server 140 via network 130, and the specification is provided to exchange server host 140 by seller client 210 via network 130.

Figure 3:
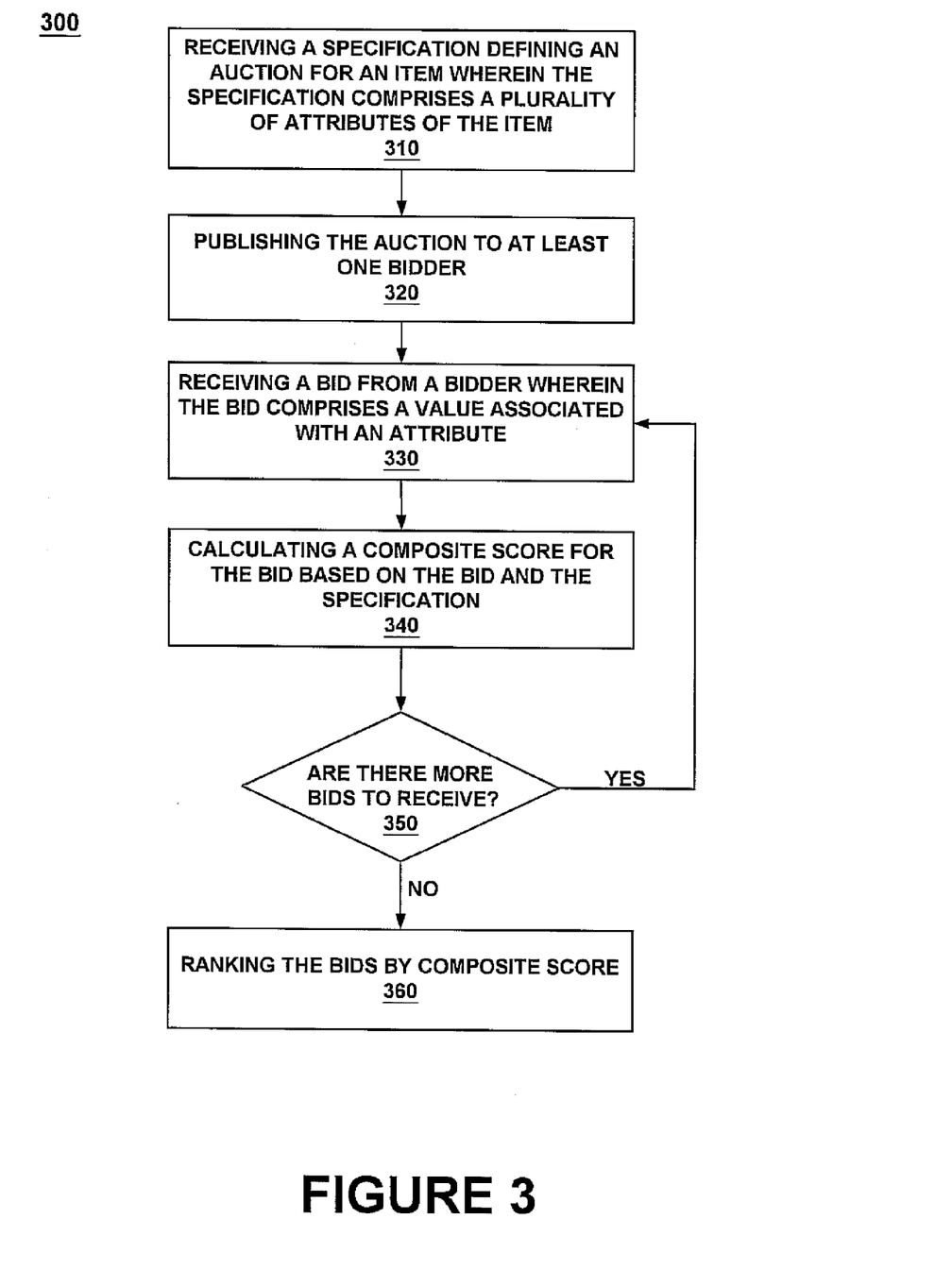
FIG. 3 illustrates a flowchart showing steps in a process for implementing attribute-based bidding and bid comparison in an electronic exchange in accordance with one embodiment of the present invention.

FIG. 3 illustrates a flowchart showing steps in a process 300 for implementing attribute-based bidding and bid comparison in an electronic exchange in accordance with one embodiment of the present invention. In one embodiment, process 300 is carried out by processors and electrical components under the control of computer readable and computer executable instructions. Although specific steps are disclosed in process 300, such steps are exemplary. That is, the embodiments of the present invention are well suited to performing various other steps or variations of the steps recited in FIG. 3. As depicted in FIG. 3, process 300 diagrams the operating process of implementing attribute-based bidding and bid comparison in an electronic exchange as performed by, for example, system 100 of FIG. 1, as a buyer performs an auction to buy an item from multiple competing sellers.

At step 310, a specification defining an auction for an item is received. In one embodiment, the specification comprises a plurality of attributes of the item. An attribute defines the functionality of an aspect of the item with respect to the current auction. In one embodiment, a person organizing the auction defines the attributes. In order to design an auction to obtain the optimal results, the organizer determines which characteristics of the item are important. These characteristics are defined as attributes. In one embodiment, the price of the item is an attribute. In another embodiment, the delivery date of the item is an attribute. It should be appreciated that any characteristic of the item may be defined as an attribute. The auction organizer then determines a value or a range of values with respect to each attribute, and then assigns a score to each value or range of value. In one embodiment, the score ranges from zero to one hundred, with zero being the least desirable and one hundred being the most desirable. In one embodiment, the auction organizer also assigns a relative weight to the attributes. In one embodiment, a relative weight is assigned to some (e.g., a portion) of the attributes. In one embodiment, the relative weight is a percentage where the greater the percentage assigned to the attribute, the more important the attribute.

Figure 4:
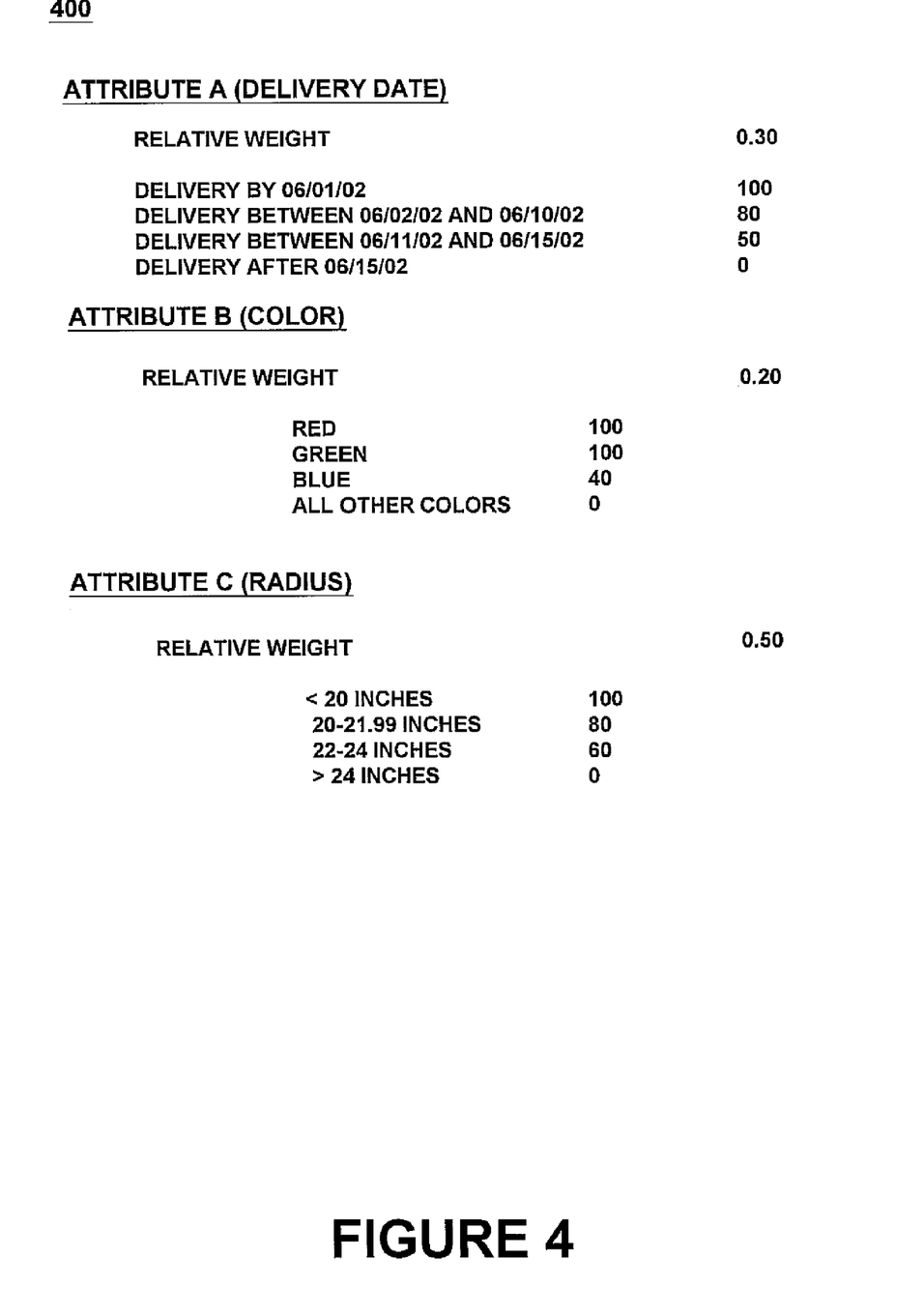
FIG. 4 illustrates an exemplary specification in accordance with one embodiment of the present invention.

FIG. 4 illustrates an exemplary specification 400 in accordance with one embodiment of the present invention. Specification 400 is designed for use in a procurement auction. Specification 400 comprises three attributes: Attribute A (delivery date); Attribute B (color); and Attribute C (radius). Each attribute comprises a relative weight, and a value or range of values and a corresponding score for each value or range of values.

With respect to Attribute A (delivery date), a range of values is defined with a corresponding score for each range. For example, if a seller can deliver the item by Jun. 1, 2002, the seller receives 100 points for Attribute A. Likewise, the seller will receive 80 points if the seller can deliver the item after June 1, but before June 10. The seller receives progressively fewer points for Attribute A as the delivery date is extended. In other words, the buyer desires an early delivery date, but will accept a later delivery date. However, in order to submit a winning bid, a bidder with a later delivery date will have to compensate in another attribute (e.g., offering a low radius).

With respect to Attribute B (color), a value is defined with a corresponding score for each value. For example, if a seller can provide a red or green item, the seller receives 100 points for Attribute B. If a seller can provide a blue item, the seller receives 40 points for Attribute B. All other items receive zero points. In other words, the buyer strongly desires a red or green item, will accept a blue item, and will not accept any other colors.

With respect to Attribute C (radius), a range of values is defined with a corresponding score for each range. For example, if a seller can provide the item with a radius of under 20 inches, the seller receives 100 points for Attribute A. Similarly, the seller will receive 80 points if the seller can provide the item with a radius anywhere from 20 to 22 inches. The seller receives progressively fewer points for Attribute C as the radius increases. In other words, the buyer desires an item with having a low radius, but will accept a larger radius under certain conditions. However, in order to submit a winning bid, a bidder with a higher radius will have to compensate in another attribute (e.g., promising an early delivery date).

Still with reference to FIG. 4, specification 400 also comprises a relative weight for each attribute: Attribute A has a relative weight of 30%, or 0.30; Attribute B has a relative weight of 20%, or 0.20, and Attribute C has a relative weight of 50%, or 0.50. In other words, the buyer is most concerned with receiving a desired radius. The buyer also is fairly concerned with receiving the item as early as possible, and is least concerned with the color of the item. Assigning a relative weight to each attribute allows the auction organizer to obtain the most desirable outcome to the auction.

At step 320, the auction is published to at least one bidder. In one embodiment, the auction is published over a distributed computer network (e.g., distributed computer network 130 of FIGS. 1 and 2). In one embodiment, the auction is published by transmitting an electronic message to potential auction participants. It should be appreciated that the auction can be published in any way intended to appraise potential participants of the existence of the auction.

In one embodiment, the auction as published includes the attributes and the associated value or range of values and scores for each value or range of values. The present embodiment allows the auction organizer to inform potential participants of the most important attributes and how to submit a desirable bid. In another embodiment, the auction as published includes the attributes, but not the associated value or range of values. The present embodiment allows the auction organizer to keep certain aspects of the auction secret.

Upon receiving the auction as published, a bidder will enter in values for each attribute. As described above, the bidder may or may not be aware of the scores associated with their values as entered.

Figure 5:
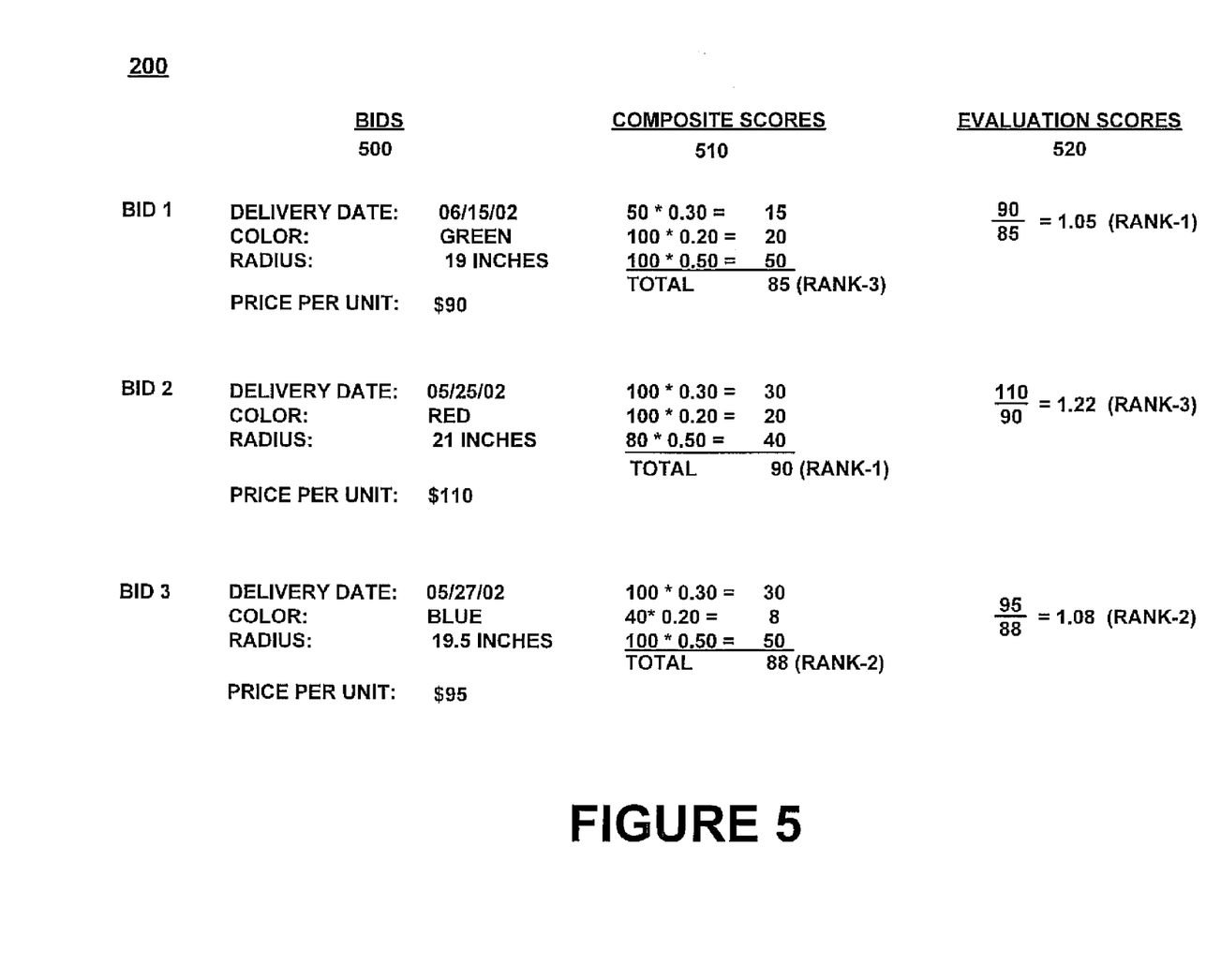
FIG. 5 illustrates exemplary bids with corresponding composite scores and evaluation scores in accordance with one embodiment of the present invention.

At step 330, a bid from the bidder is received, wherein the bid comprises a value associated with at least one attribute. In one embodiment, the bid also comprises a price. FIG. 5 illustrates three exemplary bids corresponding to specification 400 of FIG. 4. FIG. 5 also illustrates the corresponding composite scores and evaluation scores, as described below at FIGS. 6 and 7, respectively. For example, Bid 1 as received has a delivery date of Jun. 15, 2002, an item color of green, and a radius of 19 inches.

Figure 6:
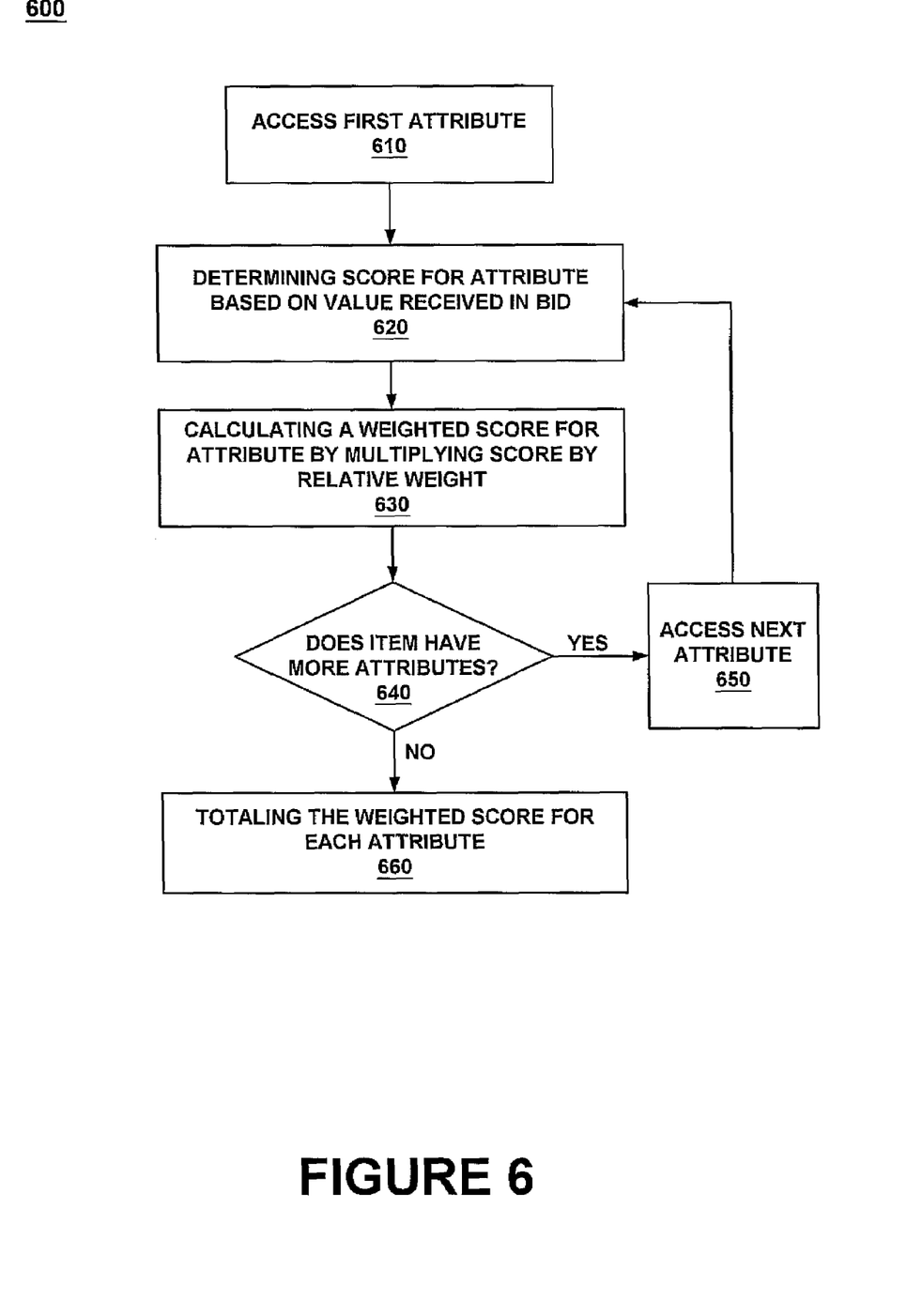
FIG. 6 illustrates a flowchart showing steps in a process for determining a composite score for a bid in accordance with one embodiment of the present invention.

At step 340, a composite score is calculated for the bid based on the bid and the specification. FIG. 6 illustrates a flowchart showing steps in a process 600 for determining a composite score for a bid in accordance with one embodiment of the present invention.

At step 610 of FIG. 6, the first attribute for the bid is accessed. At step 620, the score for the attribute is determined based on the value as received in the bid. For example, considering specification 400 of FIG. 4 and Bid 1 of FIG. 5, the first attribute (e.g., Attribute A) receives a score of 50, as the delivery date of Jun. 15, 2002 resides within the range from Jun. 11, 2002 through Jun. 15, 2002 as defined in specification 400. This range is assigned 50 points in specification 400.

At step 630, a weighted score for the attribute is calculated by multiplying the score as determined at step 620 by the relative weight. Continuing with the example described at step 620, the weighted score for the attribute is determined by multiplying the score of 50 by the relative weight of 0.30. Thus, the weighted score for Attribute A is 15.

At step 640, it is determined whether the item has any more attributes. Provided there are more attributes that require a weighted score determination, process 600 proceeds to step 650. At step 650, the next attribute is accessed. Process 600 then proceeds to step 620. It should be appreciated that steps 620-640 are repeated for every attribute of the item.

Once all attributes have been accessed, and a weighted score has been determined for each, process 600 proceeds to step 660. At step 660, the weighted score for each attribute is totaled, resulting in the composite score. Composite scores 510 of FIG. 5 illustrates three examples of composite score determination. Once the composite score for the bid has been calculated, process 600 ends, and process 300 of FIG. 3 proceeds to step 350.

At step 350, it is determined whether there are any more bids to receive. Provided there are more bids to receive, process 300 returns to step 330. It should be appreciated that steps 330-350 are repeated for every bid received. Once all bids have been received, process 300 proceeds to step 360. In one embodiment, once the auction has ended, it is determined that all bids have been received.

At step 360, the bids are ranked according the their respective composite scores. In one embodiment, the highest composite score is desired. In one embodiment, the bids are ranked according to their respective composite scores from highest to lowest. Composite scores 510 of FIG. 5 illustrate an exemplary ranking. For example, Bid 2, with a composite score of 90, received the highest composite score, and is thus ranked first. Similarly, Bids 3 and 1, with 88 points and 85 points respectively, are ranked second and third.

Figure 7:
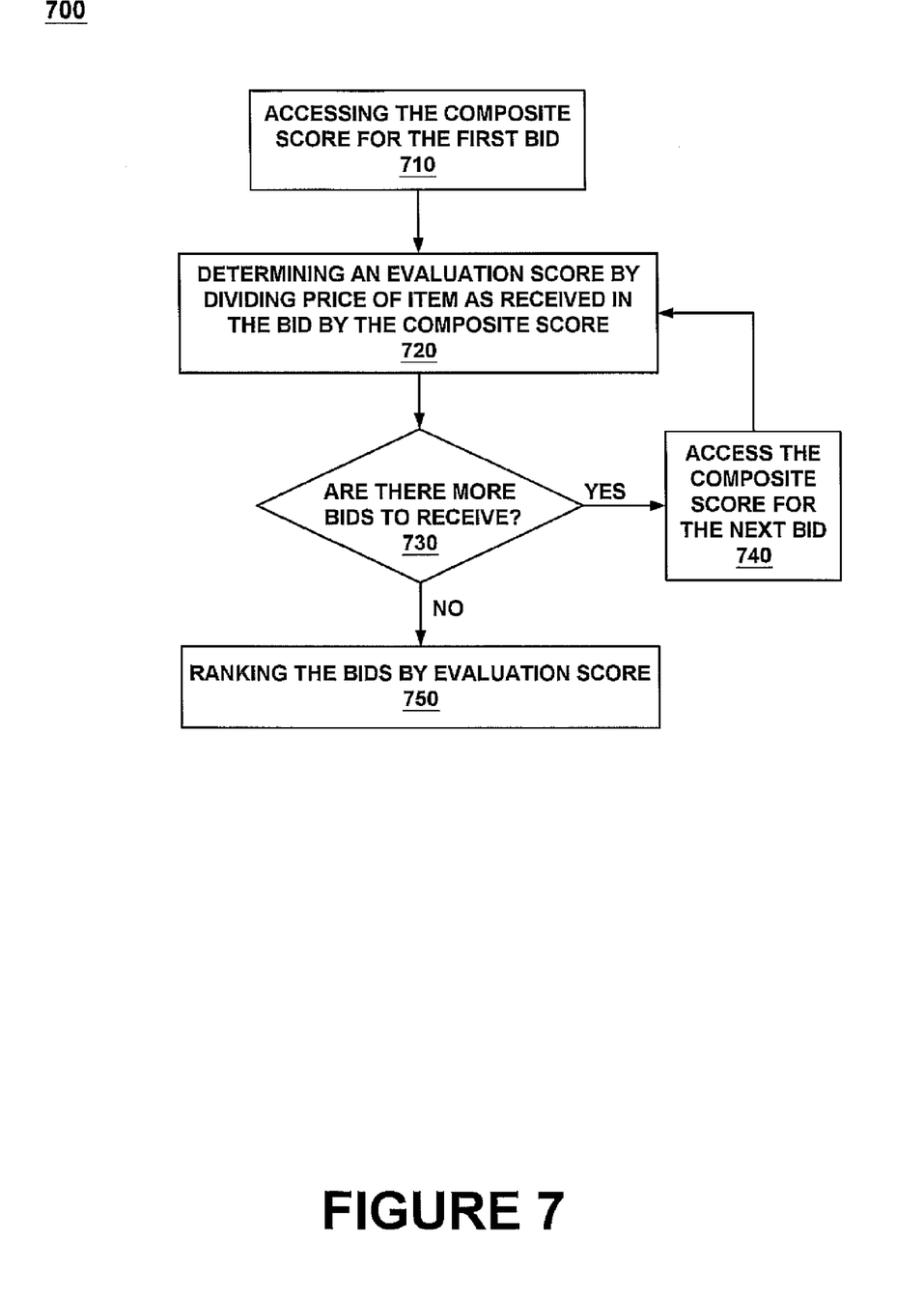
FIG. 7 illustrates a flowchart showing steps in a process for determining an evaluation score for a bid in accordance with one embodiment of the present invention.

Embodiments of the present invention allow for an auction organizer to source for the best value of a bid by quantifying the utility of the item. One way to compare bids to determine the ranking in the order of value provided by the bid, is to compare the ratio of the bid price to the composite score for each bid. FIG. 7 illustrates a flowchart showing steps in a process 700 for determining an evaluation score for a bid in accordance with one embodiment of the present invention.

At step 710 of process 700, the composite score for the first bid is accessed. At step 720, an evaluation score for the bid is determined by dividing the price of the item as received in the bid by the composite score. For example, considering specification 400 of FIG. 4 and Bid 1 of FIG. 5, Bid 1 has a composite score of 85 and a price per item of $90. Dividing 90 by 85 gives a value of 1.05.

At step 730, it is determined whether there are any more bids that require an evaluation score determination. Provided there are bids that require an evaluation score determination, process 700 proceeds to step 740. At step 740, the composite score for the next bid is accessed. Process 700 then returns to step 720. It should be appreciated that steps 720 and 730 are repeated for every bid.

At step 750, the bids are ranked according the their respective evaluation scores. In one embodiment, the lowest evaluation score is desired. In the present embodiment, the bids are ranked according to their respective evaluation scores from lowest to highest. Evaluation scores 520 of FIG. 5 illustrate an exemplary ranking. For example, Bid 1, with an evaluation score of 1.05, received the lowest evaluation score, and is thus ranked first. Similarly, Bids 3 and 2, with evaluation scores of 1.08 and 1.22 respectively, are ranked second and third. With respect to FIG. 5, composite scores 510 and evaluation scores 520 provide different rankings for Bids 1-3.

Figure 8:
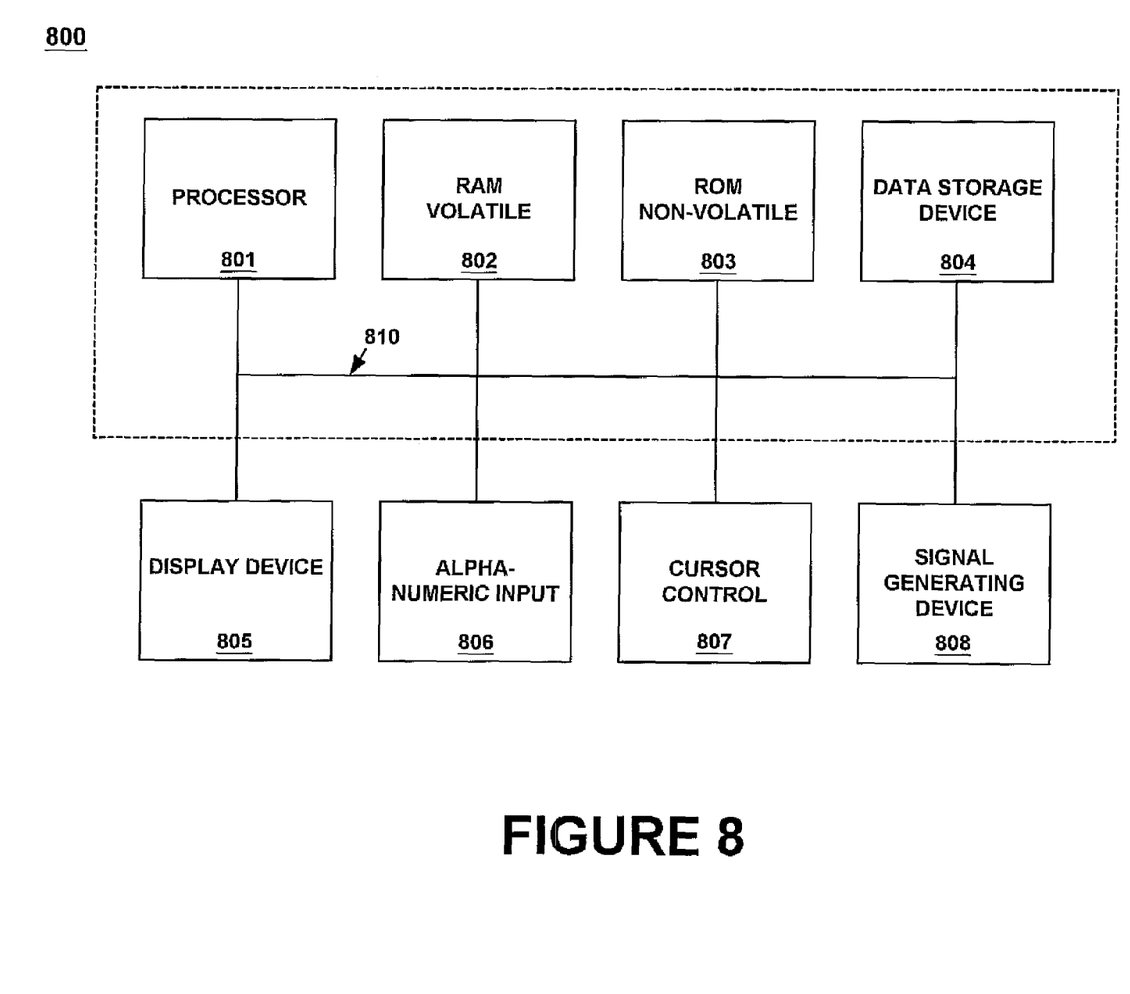
FIG. 8 illustrates a block diagram of an exemplary computer system upon which embodiments of the present invention may be implemented.

Exemplary Hardware Upon which Embodiments of the Present Invention may be Implemented Portions of the present invention are comprised of computer-readable and computer executable instructions which reside, for example, in computer-usable media of a computer system. FIG. 8 illustrates a block diagram of an exemplary computer system 800 upon which embodiments of the present invention may be implemented. Computer system 800 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 800) and are executed by the processor(s) of system 800. When executed, the instructions cause the computer system 800 to implement the functionality of the present invention as described above.

In general, computer system 800 shows the basic components of a computer system used to implement "server" machines and "client" machines. Computer system 800 comprises an address/data bus 810 for communicating information, one or more central processors 801 coupled with the bus 810 for processing information and instructions, a computer readable volatile memory unit 802 (e.g., random access memory, static RAM, dynamic, RAM, etc.) coupled with the bus 810 for storing information and instructions for the central processor(s) 801, a computer readable non-volatile memory unit 803 (e.g., read only memory, programmable ROM, flash memory, EPROM, EEPROM, etc.) coupled with the bus 810 for storing static information and instructions for the processor(s) 801. System 800 also includes a computer readable data storage device 804 such as a magnetic or optical disk and disk drive coupled with the bus 810 for storing information and instructions. Optionally, system 800 can include a display device 805 coupled to the bus 810 for displaying information to the computer user, an alphanumeric input device 806 including alphanumeric and function keys coupled to the bus 810 for communicating information and command selections to the central processor(s) 801, a cursor control device 807 coupled to the bus for communicating user input information and command selections to the central processor(s) 801, and a signal generating device 808 coupled to the bus 810 for communicating command selections to the processor(s) 801.

The preferred embodiment of the present invention, a method and system implementing attribute-based bidding and bid comparison in an electronic exchange, is thus described. While the present invention has been described in particular embodiments, it should be appreciated that the present invention should not be construed as limited by such embodiments, but rather construed according to the below claims.

What is claimed is:

1. An auction method comprising:
   receiving a specification defining an auction for an item, said specification comprising a plurality of attributes of said item wherein attributes of said plurality of attributes comprise a plurality of values and a plurality of attribute scores associated with said plurality of values and wherein a portion of said plurality of attributes comprise a relative weight, wherein said relative weight is an indication of relative importance between said plurality of attributes, and wherein an attribute score indicates the relative importance of the attribute compared to the same attribute having different values;
   publishing said auction to at least one bidder;
   receiving a bid from said bidder, said bid comprising a plurality of bid values wherein each of said plurality of bid values is associated with at least one of said attributes; and
   calculating a composite score for said bid, said calculating comprising:
      determining a plurality of attribute scores corresponding to said received bid based on said received plurality of bid values and said plurality of values of said received specification that have a corresponding attribute scores;
      calculating a weighted score for each of said plurality of attribute scores by multiplying each of said plurality of attribute scores by its corresponding relative weight; and
      totaling said weighted score of each of said plurality of attribute scores.

2. The auction method as recited in claim 1 wherein said auction is published to at least one bidder via a distributed computer network.

3. The auction method as recited in claim 1 wherein one of said plurality of attributes is said price of said item.

4. The auction method as recited in claim 1 further comprising ranking a plurality of said bids based on said composite score for each said bid.

5. The auction method as recited in claim 1 further comprising determining an evaluation score by dividing a bid price of said item as received in said bid by said composite score for said bid.

6. The auction method as recited in claim 5 further comprising ranking a plurality of said bids based on said evaluation score for each said bid.

7. A computer-readable medium having computer-readable program code embodied therein for causing a computer system to perform an attribute-based auction method, said method comprising:
   receiving a specification defining an auction for an item, said specification comprising a plurality of attributes of said item, wherein attributes of said plurality of attributes comprise a plurality of values and a plurality of attribute scores associated with said plurality of values and wherein a portion of said plurality of attributes comprise a relative weight, wherein said relative weight is an indication of relative importance between said plurality of attributes, and wherein an attribute score indicates the relative importance of the attribute compared to the same attribute having different values;
   publishing said auction to at least one bidder;
   receiving a bid from said bidder, said bid comprising a plurality of bid values wherein each of said plurality of bid values is associated with at least one of said attributes; and
   calculating a composite score for said bid, said calculating comprising:
      determining a plurality of attribute scores corresponding to said received bid based on said received plurality of bid values and said plurality of values of said received specification that have a corresponding attribute scores;

calculating a weighted score for each of said plurality of attribute scores by multiplying each of said plurality of attribute scores by its corresponding relative weight; and totaling said weighted score of each of said plurality of attribute scores.

8. The computer-readable medium as recited in claim 7 wherein said auction is published to at least one bidder via a distributed computer network.

9. The computer-readable medium as recited in claim 7 wherein one of said plurality of attributes is said price of said item.

10. The computer-readable medium as recited in claim 7 further comprising ranking a plurality of said bids based on said composite score for each said bid.

11. The computer-readable medium as recited in claim 7 further comprising determining an evaluation score by dividing a bid price of said item as received in said bid by said composite score for said bid.

12. The computer-readable medium as recited in claim 11 further comprising ranking a plurality of said bids based on said evaluation score for each said bid.

13. A computer system comprising:
a bus;
a memory unit coupled to said bus, and
a processor coupled to said bus, said processor for executing a method for operating an auction, said method comprising:
   receiving a specification defining said auction for an item, said specification comprising a plurality of attributes of said item wherein attributes of said plurality of attributes comprise a plurality of values and a plurality of attribute scores associated with said plurality of values and wherein a portion of said plurality of attributes comprise a relative weight, wherein said relative weight is an indication of relative importance between said plurality of attributes, and wherein an attribute score indicates the relative importance of the attribute compared to the same attribute having different values;
   publishing said auction to at least one bidder;
   receiving a bid from said bidder, said bid comprising a bid price for said item and a plurality of bid values wherein each of said plurality of bid values is associated with at least one of said attributes;
   calculating a composite score for said bid, said calculating comprising:
      determining a plurality of attribute scores corresponding to said received bid based on said received plurality of bid values and said plurality of values of said received specification that have a corresponding attribute scores;
      calculating a weighted score for each of said plurality of attribute scores by multiplying each of said plurality of attribute scores by its corresponding relative weight; and
      totaling said weighted score of each of said plurality of attribute scores; and
   calculating an evaluation score by dividing said bid price by said composite score for said bid.

14. The computer system as recited in claim 13 further comprising ranking a plurality of said bids based on said evaluation score for each said bid.

15. A system for operating an auction comprising:
means for receiving a specification defining said auction for an item, said specification comprising a plurality of attributes of said item wherein attributes of said plurality of attributes comprise a plurality of values and a plurality of attribute scores associated with said plurality of values and wherein a portion of said plurality of attributes comprise a relative weight, wherein said relative weight is an indication of relative importance between said plurality of attributes, and wherein an attribute score indicates the relative importance of the attribute compared to the same attribute having different values;
means for publishing said auction to at least one bidder;
means for receiving a bid from said bidder, said bid comprising a plurality of bid values wherein each of said plurality of bid values is associated with at least one of said attributes; and
means for calculating a composite score of said bid said means for calculating comprising:
   means for determining a plurality of attribute scores corresponding to said received bid based on said received plurality of bid values and said plurality of values of said received specification that have a corresponding attribute scores;
   means for calculating a weighted score for each of said plurality of attribute scores by multiplying each of said plurality of attribute scores by its corresponding relative weight; and
   means for totaling said weighted score of each of said plurality of attribute scores.

16. The system as recited in claim 15 further comprising means for determining an evaluation score based on a bid price of said item as received in said bid by said composite score for said bid.

* * * * *

UNITED STATES PATENT AND TRADEMARK OFFICE
CERTIFICATE OF CORRECTION

| | |
|---|---|
| PATENT NO. | : 7,401,034 B1 |
| APPLICATION NO. | : 10/185167 |
| DATED | : July 15, 2008 |
| INVENTOR(S) | : Srivastava et al. |

It is certified that error appears in the above-identified patent and that said Letters Patent is hereby corrected as shown below:

On title page, in item 56, in column 2, under "Other Publications", line 15, delete "Dialong" and insert -- Dialog --, therefor.

In column 8, line 32, after "according" delete "the" and insert -- to --, therefor.

In column 8, line 62, after "according" delete "the" and insert -- to --, therefor.

Signed and Sealed this

Tenth Day of November, 2009

David J. Kappos
*Director of the United States Patent and Trademark Office*